(12) United States Patent
Villette

(10) Patent No.: US 11,472,122 B2
(45) Date of Patent: *Oct. 18, 2022

(54) FABRICATION OF COMPOSITE PARTS BY ADDITIVE MANUFACTURING AND MICROSTRUCTURE TOPOLOGY CUSTOMIZATION

(71) Applicant: Saudi Arabian Oil Company, Dhahran (SA)

(72) Inventor: Thibault Villette, Al-Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 17/323,640

(22) Filed: May 18, 2021

(65) Prior Publication Data

US 2021/0268745 A1 Sep. 2, 2021

Related U.S. Application Data

(63) Continuation-in-part of application No. 16/460,543, filed on Jul. 2, 2019, now Pat. No. 11,014,295.

(51) Int. Cl.
*B29C 64/393* (2017.01)
*B29C 64/153* (2017.01)
(Continued)

(52) U.S. Cl.
CPC .......... *B29C 64/393* (2017.08); *B29C 64/153* (2017.08); *B29C 64/255* (2017.08);
(Continued)

(58) Field of Classification Search
None
See application file for complete search history.

(56) References Cited

U.S. PATENT DOCUMENTS 9,757,802 B2  9/2017  Cui et al.
10,307,823 B1  6/2019  Deaton, Jr. et al.
(Continued)

FOREIGN PATENT DOCUMENTS

WO  2016209233 A1  12/2016
WO  2017108645 A1  6/2017

OTHER PUBLICATIONS

International Preliminary Report on Patentability in Corresponding PCT Application No. PCT/US2020/039772 dated Dec. 28, 2021. 6 pages.

(Continued)

*Primary Examiner* — Bernard G Lindsay
(74) *Attorney, Agent, or Firm* — Leason Ellis LLP

(57) ABSTRACT

A system and method for optimizing an additive manufacturing process in which a reinforcement material is randomly introduced to a fabrication bed. An image of the fabrication bed is captured. The image is analyzed by code in a computer to identify the actual arrangement of the randomly deposited reinforcement material relative to the object being manufactured. Based on the image data showing the reinforcement material, a toolpath is dynamically determined that incorporates the random reinforcement material. Accordingly, the toolpath incorporates the reinforcement material into the structure of the object, which can result in a reduction of the total amount of raw material is fused to create the object being manufactured.

19 Claims, 10 Drawing Sheets

(51) Int. Cl.
*B33Y 50/02* (2015.01)
*B33Y 10/00* (2015.01)
*B33Y 30/00* (2015.01)
*B29C 64/255* (2017.01)

(52) U.S. Cl.
CPC .............. *B33Y 10/00* (2014.12); *B33Y 30/00* (2014.12); *B33Y 50/02* (2014.12)

(56) References Cited

U.S. PATENT DOCUMENTS

| | | |
|---|---|---|
| 2003/0010409 A1 | 1/2003 | Kunze et al. |
| 2006/0276925 A1 | 12/2006 | Lin et al. |
| 2007/0075450 A1 | 4/2007 | Belegundu et al. |
| 2013/0056672 A1 | 3/2013 | Johnston et al. |
| 2013/0294644 A1 | 11/2013 | Cork et al. |
| 2014/0050921 A1 | 2/2014 | Lyon et al. |
| 2014/0147240 A1 | 5/2014 | Noda et al. |
| 2014/0277669 A1 | 9/2014 | Nardi et al. |
| 2015/0177158 A1 | 6/2015 | Cheverton |
| 2015/0190971 A1 | 7/2015 | Musuvathy et al. |
| 2015/0239178 A1 | 8/2015 | Armstrong |
| 2015/0352639 A1 | 12/2015 | Toyserkani et al. |
| 2015/0360288 A1 | 12/2015 | Zalewski |
| 2016/0067928 A1 | 3/2016 | Mark et al. |
| 2016/0096318 A1 | 4/2016 | Bickel et al. |
| 2016/0311165 A1 | 10/2016 | Mark et al. |
| 2017/0259502 A1 | 9/2017 | Chapiro et al. |
| 2018/0264735 A1 | 9/2018 | Vilajosana |
| 2018/0304540 A1 | 10/2018 | Tobia et al. |
| 2018/0305266 A1 | 10/2018 | Gibson et al. |
| 2019/0187047 A1 | 6/2019 | Chattopadhyay et al. |
| 2019/0283333 A1 | 9/2019 | Hwang et al. |
| 2019/0366680 A1* | 12/2019 | Dua ............ D04H 1/492 |
| 2020/0247061 A1 | 8/2020 | Putman et al. |

OTHER PUBLICATIONS

International Search Report in Corresponding PCT Application No. PCT/US2020/039772 dated Oct. 28, 2020. 5 pages.

Debout et al. 'Tool path smoothing of a redundant machine: Application to Automated Fiber Placement' Computer-Aided Design 43 (2011) 122-132.

Schmitt et al. 'Real-Time Machine Vision System for an Automated Quality Monitoring in Mass Production of Multiaxial Non-Crimp Fabrics' IFAC—PapersOnline 48-3 (2015) 2393-2398.

Frketic et al. 'Automated manufacturing and processing of fiber-reinforced polymer (FRP) composites: An additive review of contemporary and modern techniques for advanced materials manufacturing' Additive Manufacturing 14 (2017) 69-86.

* cited by examiner

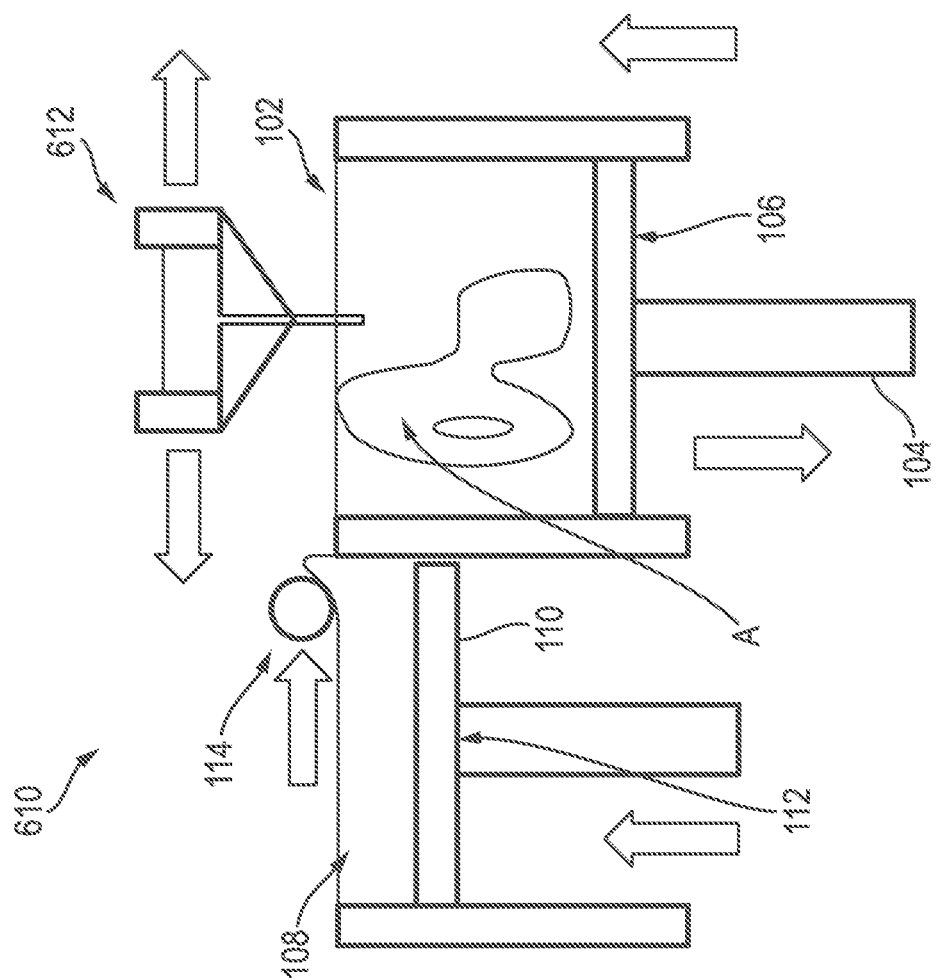

| Microstructure name | Pure HDPE | Composite | RVE #1 | RVE #2 | RVE #3 | RVE #4 |
|---|---|---|---|---|---|---|
| Porosity volume % | 0 | 0 | 35 | 35 | 35 | 35 |
| Density $\rho$ - $kg.m^{-3}$ | 905.0 | 1070.8 | 754.0 | 754.0 | 754.0 | 754.0 |
| Young modulus E - Pa | 1.10E+09 | 1.54E+09 | 2.73E+08 | 3.76E+08 | 5.69E+08 | 9.98E+08 |
| Specific modulus $S_m$ - $N.m.kg^{-1}$ | 1.22E+06 | 1.44E+06 | 3.62E+05 | 4.99E+05 | 7.54E+05 | 1.32E+06 |

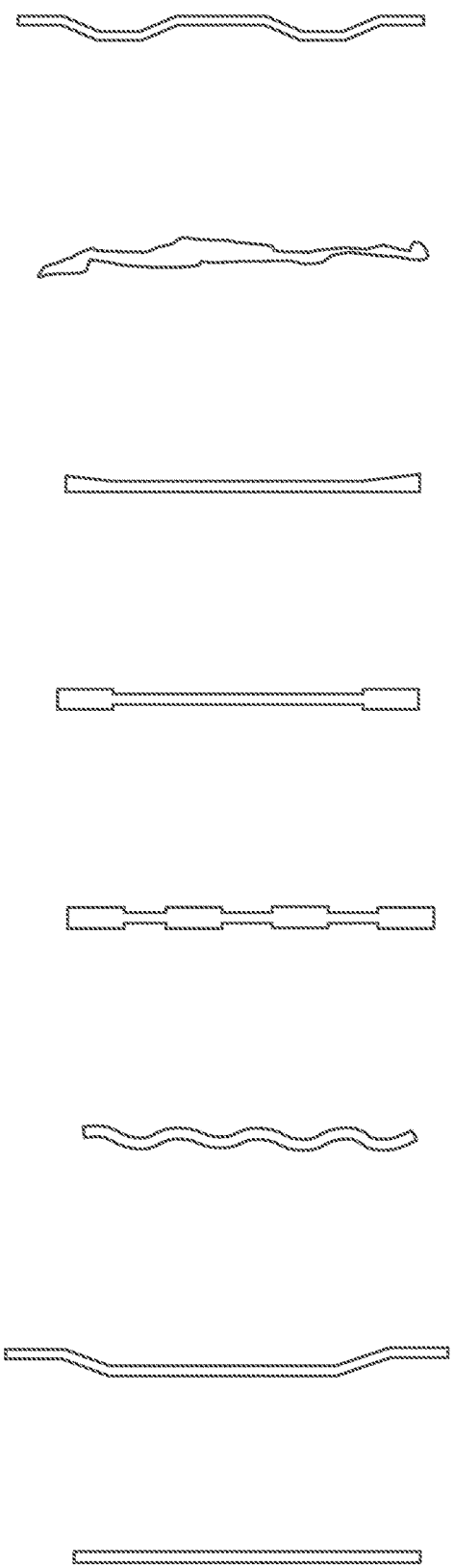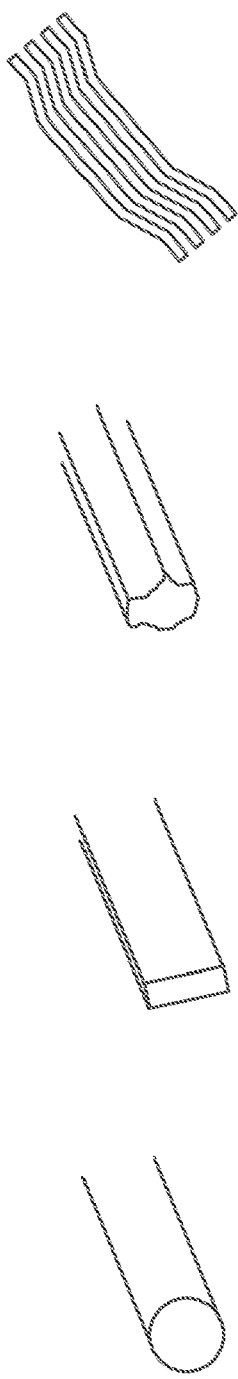

FABRICATION OF COMPOSITE PARTS BY ADDITIVE MANUFACTURING AND MICROSTRUCTURE TOPOLOGY CUSTOMIZATION

CROSS-REFERENCE TO RELATED APPLICATIONS

This application is a continuation-in-part of U.S. patent application Ser. No. 16/460,543, filed Jul. 2, 2019, the disclosure of which is hereby incorporated by reference.

FIELD OF THE DISCLOSURE

The present disclosure provides for improved additive manufacturing processes and, in particular, additive manufacturing processes that incorporate reinforcements.

BACKGROUND OF THE DISCLOSURE

Additive manufacturing systems and processes typically involve forming a part layer-by-layer. In such systems, a tool is moved across a fabrication bed to activate (e.g., fuse, melt, harden, etc.) loose, raw material in order to form each layer. Typically, a 3D model of the part to be manufactured is created and then the model is "sliced" into layers to define a path the tool must take in order to fuse each respective layer of the part. These fused layers are added one on top of the other until the stacked individual layers together result in the fabrication of the three-dimensional object corresponding to the 3D model. While the toolpath from one layer to the next may differ according to the geometry of the object being created, these toolpaths are predefined based on the object geometry and do not change during the manufacturing process.

It has also been known to include reinforcement materials in the additive manufacturing process. A reinforcement material can be randomly added to the fabrication bed together with the raw material. However, since the reinforcement material is randomly distributed, manufacturing systems operate on the basis of an assumed average distribution of the reinforcement material in each layer of the fabrication bed. As such, a designer may be able to assume that the part will be a stronger by a certain percentage and, based on that improvement of strength, may be able to create a design having, for example, thinner walls by taking advantage of the average strength improvement. Accordingly, a predetermined toolpath can be provided for an object that has been designed assuming an average distribution of randomly deposited reinforcement. However, this type of manufacturing still relies on a predetermined toolpath.

Other additive manufacturing systems include equipment that lays down reinforcement material in a controlled manner (e.g., by laying reinforcing cord along a controlled path). While such a system offers advantages because the exact location of the reinforcement can be controlled, systems of this type which have to deposit the reinforcement in a controlled manner are complicated and their operation slows down the manufacturing process.

The present disclosure solves these and other problems with a technical solution as disclosed herein.

SUMMARY OF THE DISCLOSURE

According to an embodiment consistent with the disclosure, a method for manufacturing an object using an additive manufacturing process is provided. The method includes the steps of: providing loose raw material to a fabrication bed; providing loose reinforcing material to the fabrication bed having a random distribution; capturing an image of the raw material and the reinforcement material; processing the image to identify an arrangement of the reinforcement material in the fabrication bed; dynamically determining a toolpath based upon the arrangement of the identified reinforcement material; and operating a tool to activate the raw material along the determined toolpath in a layer of the object being manufactured.

In a more particular embodiment, the step of dynamically determining the toolpath based on the arrangement of the identified reinforcement material includes: identifying a portion of raw material to be activated to structurally incorporate at least a portion of the loose reinforcement material into the layer of the object being manufactured.

An embodiment can have the step of dynamically determining the toolpath further including identifying another portion of raw material that is not activated to define a void, and the step of operating the tool further including controlling the tool to activate the raw material in the layer of the object being manufactured so as to bound the void.

In an embodiment, the step of dynamically determining the toolpath based on the arrangement of the identified reinforcement material includes: identifying an individual piece of reinforcement material which resides between boundary walls of the object being manufactured; and defining a rib as a portion of raw material to be activated so as to structurally incorporate the individual piece of reinforcement material. The rib extends between at least one of the boundary wall and a portion of the individual piece of reinforcement material.

In an embodiment, the step of providing reinforcing material to a fabrication bed includes providing a first and a second reinforcing material.

In an embodiment, one of the first and second reinforcing materials is a bead and the other of the first and second reinforcing material is a fiber.

In an embodiment, the step of determining the toolpath based on the arrangement of the identified reinforcement material includes reducing the weight of the object being manufactured by reducing the total amount of raw material that is activated by the tool.

In an embodiment, the step of determining the toolpath based on the arrangement of the identified reinforcement material includes minimizing a maximum stress under a given load of the object being manufactured.

In an embodiment, the step of determining the toolpath based on the arrangement of the identified reinforcement material includes reducing the weight of the manufactured object and minimizing a maximum stress under a given load of the object being manufactured.

According to another embodiment, a system for manufacturing an object from a raw material and a reinforcement material using an additive manufacturing process is provided. The system includes: a fabrication chamber; a raw material reservoir configured to dispense the raw material; a reinforcement material reservoir configured to dispense the reinforcement material; a fabrication bed supported by fabrication chamber, the fabrication bed having a portion of the raw material depositable thereon from the raw material reservoir as a layer and a portion of the reinforcement material depositable thereon as part of the layer; a camera configured to capture an image of the fabrication bed; a computer having a processor and software executable by the processor, wherein the computer is configured to process the image to identify the reinforcement material within the layer of the fabrication bed, the computer further being configured to dynamically determine a toolpath based on an arrangement of the identified reinforcement material in the layer; and a tool configured to activate the raw material of the fabrication bed. The tool can be controlled to operate along the determined toolpath.

In an embodiment, the system further includes another reinforcement material reservoir containing another reinforcement material. The fabrication bed further has a portion of the another reinforcement material depositable thereon as part of the layer. The computer is further configured to process the image to identify the another reinforcement material and determine the toolpath based on an arrangement of both reinforcement materials within the layer.

BRIEF DESCRIPTION OF THE DRAWINGS

FIG. 2B shows an additive manufacturing system of FIG. 1 with additional structure;

FIGS. 6A to 6H illustrate fibers as reinforcement material having various shapes and having respective technical aspects imparted to an overall structure;

FIGS. 7A to 7D illustrate fibers as reinforcement material having various cross-sections which impart respective technical aspects to an overall structure.

DETAILED DESCRIPTION CERTAIN OF
EMBODIMENTS OF THE DISCLOSURE

Figure 1:
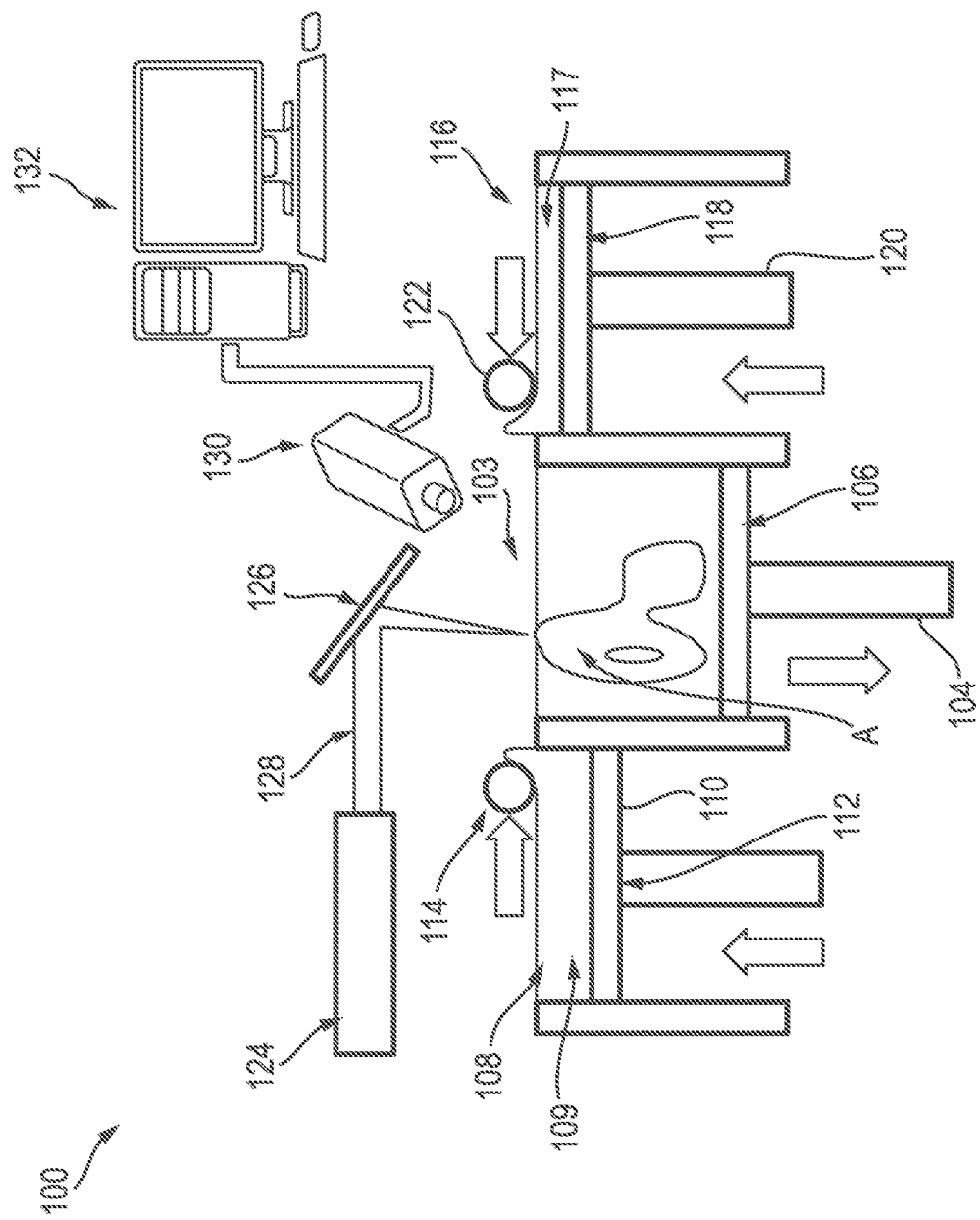
FIG. 1 shows an additive manufacturing system constructed in accordance with one embodiment of the present disclosure.

Referring to FIG. 1, an embodiment is illustrated of an additive manufacturing system 100 that can be used to fabricate parts and structures which incorporate reinforcements that have been added to a fabrication bed. The additive manufacturing system includes a fabrication chamber 102. The fabrication chamber 102 includes a piston 104 that can lower the bottom plate 106 of the fabrication chamber 102 so that successive layers of material can be added as the part is fabricated. A representative object A illustrates an exemplary part that is being fabricated in the fabrication chamber 102.

A raw material chamber 108 is disposed adjacent the fabrication chamber 102. The chamber 108 defines a space for holding raw material that is used in the additive manufacturing process to form the object being manufactured. The raw material, sometimes referred to as a matrix material, can be one of various materials that are suitable for additive manufacturing processes, such as, for example, powdered metals, powdered polymers, etc. The material chamber 108 includes a bottom plate 110 supported by a piston 112. The piston 112 can move upwardly to push the material in the material chamber 108 upwardly into position so that it thereafter can be moved, using a roller 114 or other device (e.g., a sweeper), into the fabrication chamber 102 to be used in the additive manufacturing process, as discussed in more detail below.

A reinforcement chamber 116 is disposed adjacent the fabrication chamber 102. As can be seen in FIG. 1, for example, the material chamber 108 and the reinforcement chamber 116 can be located on opposite sides of the fabrication chamber 102 in a particular implementation of an additive manufacturing system 100. The reinforcement chamber 116 defines a space for holding reinforcement material that can be added to the fabrication bed for incorporation and consequent reinforcement of the structure of the object being manufactured by the additive manufacturing process. The reinforcement material, sometimes referred to as inclusion material, can be one of various materials that are suitable for additive manufacturing processes, such as, for example, glass fibers, carbon fibers, prepreg carbon fiber chips (that is, a fabric reinforcement that has been preimpregnated with a resin), metal fibers, glass beads, etc.

As shown in FIGS. 6A to 6H, the reinforcement material can be composed of fibers having various shapes, and in certain implementations can include industrial scraps as the inclusion material, that is to say, the reinforcing element. For example, the fibers can be straight as shown in FIG. 6A. Alternatively, the fibers can be hooked in as shown in FIG. 6B. In addition, the fibers can be crimped as shown in FIG. 6C. Further, the fibers can have a double duoform as shown in FIG. 6D. Still further, the fibers can be paddled as shown in FIG. 6E. Also, the fibers can have enlarged ends as shown in FIG. 6F. Moreover, the fibers can have an irregular shape as shown in FIG. 6G. In another alternative, the fibers can have an indented shape as shown in FIG. 6H.

As can be appreciated, the reinforcement pieces that can be used can take have a variety of shapes, and more generally the addition of reinforcement material, in many implementations according to this disclosure, can be to improve the strength of a composite material by increasing adhesion between matrix and reinforcement material. Adhesion can be increased by a chemical approach in which chemical additives are introduced to increase the bonding between chosen fiber shape and the matrix. For instance, epoxy can be used as a "sizing" to bound carbon fiber with a surrounding polymer matrix, and silane-based chemicals can be used to bind glass fibers to a surrounding matrix. As can be appreciated from FIGS. 6B through 6H, a morphological approach which can be complementary to the chemical approach—has the contact surface between the reinforcement and the polymer matrix increased by way of changes in the shape of the fiber (i.e. geometry, section, surface rugosity). The consequence is that the contact surface between fiber and matrix increases, which improves the overall strength of the composite because the load transfer between fiber and matrix can be done through a larger surface, thus minimizing the risk of fiber/matrix debonding. For instance, a crimped fiber will bring higher strength compared to a straight fiber because for a given fiber length, the crimped fiber offers a wider contact surface with the resin than the straight fiber.

As shown in FIGS. 7A to 7D, the reinforcement material can be composed of fibers having various cross-sections. For example, the fibers can have a round cross-section as shown in FIG. 7A. Alternatively, the fibers can have a rectangular cross-section as shown in FIG. 7B. In addition, the fibers can have an irregular cross-section as shown in FIG. 7C. Further, the fibers can be bundled as shown in FIG. 7D. The selection of a cross-section to use for constructing a given part in the additive manufacturing apparatus can impact the strength, stiffness and compliance of the part, particularly if the reinforcements are non-symmetrical and provided to the bed with a common orientation (e.g., a wider side facing upwards).

Figure 8F:
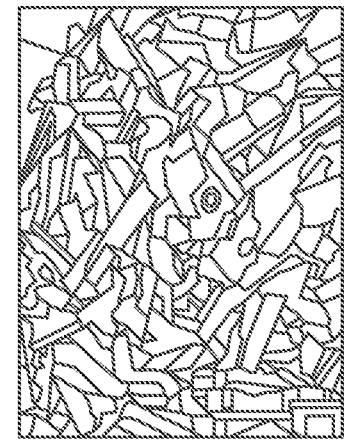
FIGS. 8A to 8F illustrate various forms of reinforcement material which impart respective technical aspects to an overall structure.
Figure 8C:
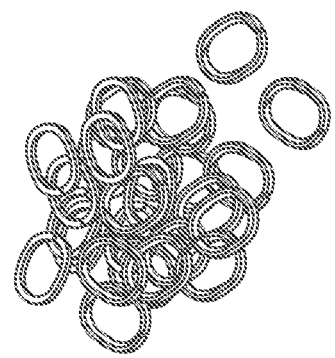
Figure 8E:
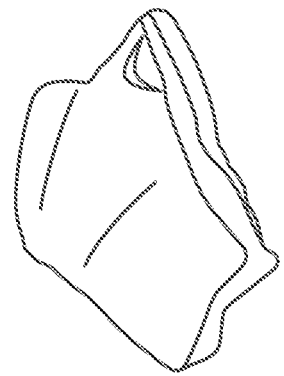
Figure 8B:
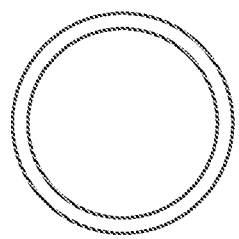
Figure 8D:
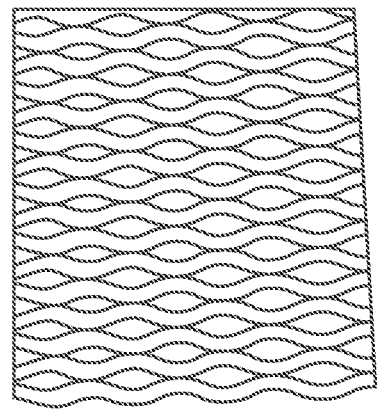
Figure 8A:
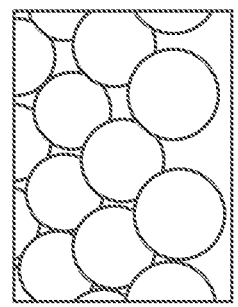

As shown in FIGS. 8A to 8F, the reinforcement material can be in various forms and compositions, such as may be available from engineered reinforcement material or scrap material used for this purpose. For example, the reinforcement material can be beads, such as glass beads, as shown in FIG. 8A. Alternatively, the reinforcement material can be closed rings as shown in FIG. 8B. In addition, the reinforcement material can be open rings as shown in FIG. 8C. Further, the reinforcement material can be pieces of mesh, such as scraps of metallic mesh or non-metallic mesh, as shown in FIG. 8D. Still further, the reinforcement material can be irregular blocks of material as shown in FIG. 8E. Moreover, the reinforcement material can be scraps of metal sheets as shown in FIG. 8F. Certain pieces have particular advantage when utilized, such as rings, open rings, pieces of mesh and metal sheet because all are generally flat and that presents a higher level of compatibility with an additive layer printing process. As well, each of these types can have a different stiffness and strength as compared to the printed polymer for the remainder of the printing bed. This latter difference naturally leads to a material stronger and stiffer than parts constructed using the polymer alone. Alternatively, the reinforcement material can be deployed in the printing bed to maximize other target properties besides strength, such as stiffness (in general not linearly related to strength) or compliance (the inverse of stiffness).

The composition of the reinforcement material can be a metal, such as steel, titanium, and iron. Alternatively, the composition of the reinforcement material can be a polymer, such as polypropylene, polyamide, polyamide-imide, carbon, aramid, polybenzoaxole, polyethylene, ultra-high molecular weight polyethylene ("UHMWPE"; a common industrial scrap), and graphite. In addition, the composition of the reinforcement material can be a rubber, such as styrene butadiene rubber. When the polymer to be used in the additive printing bed is reinforced using an elastomer (e.g., rubber), the resulting part can be an "impact modified" polymers because the addition of the elastomer makes the material less stiff but stronger against impact. In other words, the rubber gives the composite more room to deform, which is a requirement to resist impact loads. Moreover, the composition of the reinforcement material can be a mineral, such as glass, basalt, and stone. Further, the composition of the reinforcement material can be a scrap of organic material, such as shells from shellfish, as well as animal bones.

In certain embodiments consistent with the foregoing, reinforcement material can be introduced to the bed, manually or in an automated way, in a structured manner rather than a random manner. For instance, the reinforcement materials can be positioned to guaranty a target performance of the part to be constructed on the bed of the additive manufacturing apparatus, such as by aligning fibers in a direction of the bed plane to ensure a value of strength or stiffness. Also, for a given part to be constructed, localized reinforcements can be added to the powder bed in specific areas to obtain a gradient of mechanical properties across the part.

The reinforcement chamber 116 includes a bottom plate 118 supported by a piston 120. The piston 120 can move upwardly to push the reinforcement material within the reinforcement chamber 116 upwardly into position so that it can be moved, using a roller 122 or other device (e.g., a sweeper), into the fabrication chamber 102 to be used in the additive manufacturing process, as discussed in more detail below.

Figure 2A:
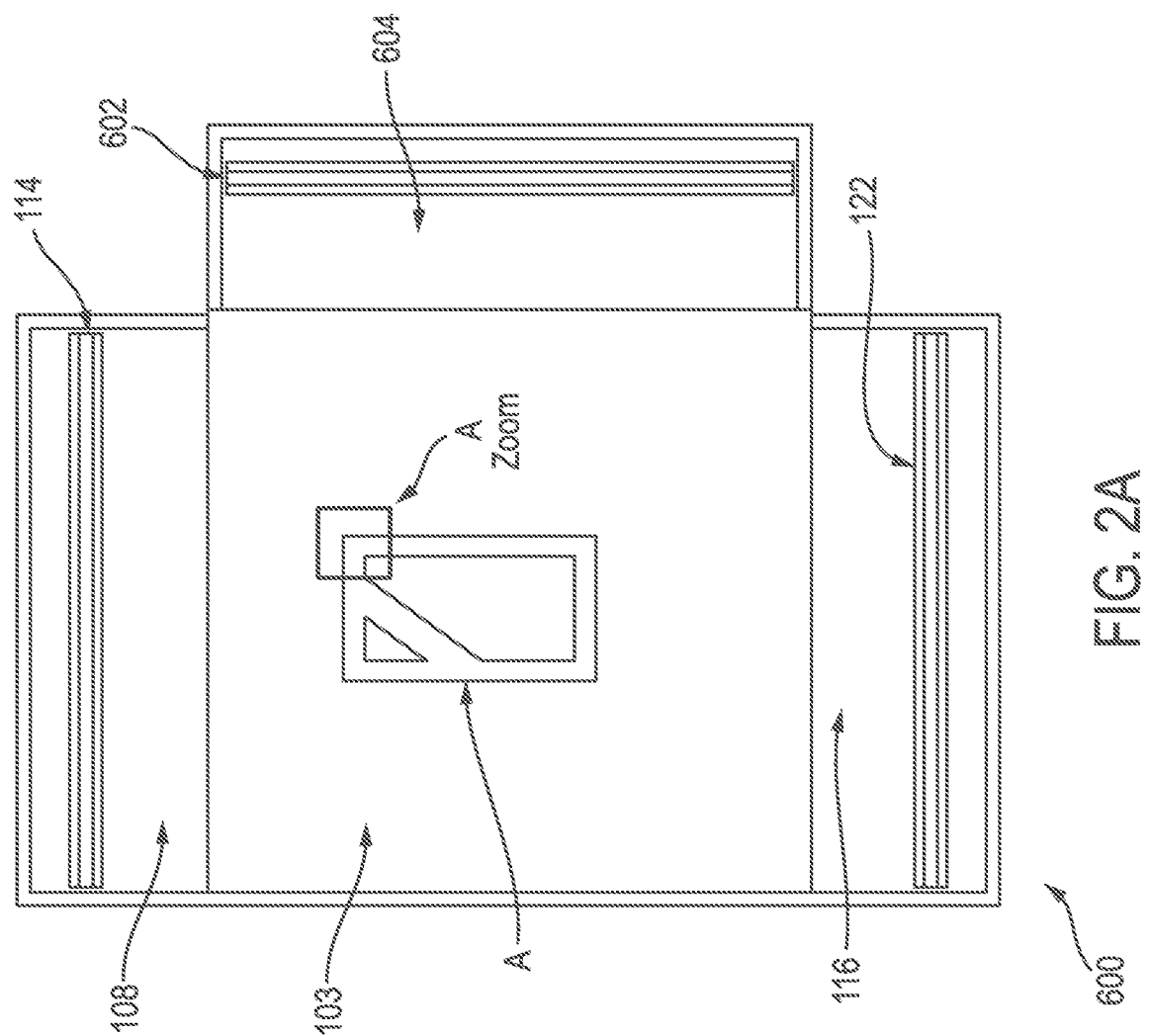
FIG. 2A shows an additive manufacturing system of FIG. 1 with additional structure.

The manufacturing system 100 includes a laser 124 and a mirror 126. The laser 124 and mirror 126 can be used to direct a laser beam 128 onto the top surface of the material within the fabrication chamber 112 on the fabrication bed 103 (see FIG. 2A). The mirror 126 can be moved to direct the laser beam along a toolpath to melt or fuse the raw material across the top plane of the fabrication bed 103 to create layer after layer of the object. A computer 128, which includes a hardware processor capable of executing software and a memory for storing software, can be used to control operation of the laser and movement of the mirror, which can be operated using computer-controlled motors, for example. Accordingly, by controlling the locations at which the laser beam imparts energy to the raw material in the fabrication chamber 112, a single layer object can be created by activating the raw material and thereby melting and fusing the raw material. As illustrated in FIG. 1, laser 128 activates the raw material by melting the raw material, however, the laser could also be configured to activate the raw material via a curing process using UV light for example, if the raw material included a UV sensitive adhesive/resin. Similarly, depending of the type of raw material being used, the activation tool can be an alternative heat source (e.g., a plasma torch) that can be used to melt metal powders. Accordingly, in certain arrangements the tool can be directly moved along the toolpath (e.g., without using a mirror) depending of the type of additive manufacturing. Repeating this process layer-by-layer, as discussed in more detail below, results in the creation of a 3D object (e.g., object A). As such, the computer control system can be used to control the operation of the manufacturing system 100 to create 3D parts through the additive manufacturing process.

In accordance with a salient aspect of the disclosure, a camera 130 is provided for imaging the fabrication chamber 102, and, more particularly, the raw material and the random arrangement of reinforcement material which has been disposed within the fabrication chamber 102 on the fabrication bed 103. The camera 130 is in communication with computer 132 so that image data collected by camera 130 can be communicated to computer 132. Computer 132 includes a hardware processor, memory, and software that is executable via the processor. The computer 132 includes one or more software modules for analyzing the image data collected by the camera 130 and for modifying the toolpath in view of the image data, as described in more detail below. The software modules can be individual modules, or multiple functionalities described herein can be combined in a single software module. Computer 132 can be the same computer that controls the operation of various elements of the fabrication system 100 via various software modules, including operation of piston 112 and roller 114 for delivery of raw material to the fabrication chamber 102, operation of piston 120 and roller 122 for delivery of reinforcement material to fabrication chamber 102, as well as the operation of laser 124, mirror 126, and piston 104 for the creation of the various layers of the fabrication object. However, separate computers or processors can be tasked with controlling the operation of the various elements of the fabrication system 100.

Figure 3A:
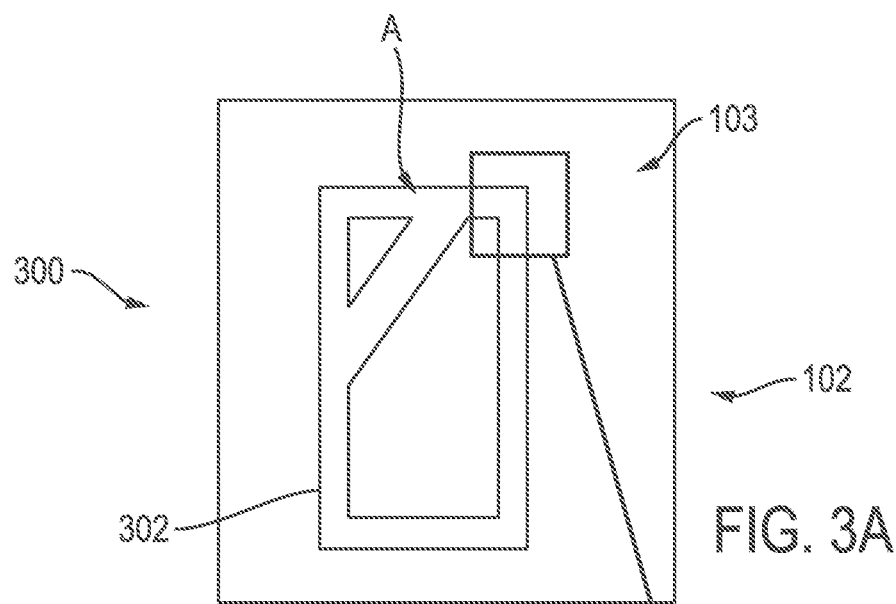
FIGS. 3A-3E illustrate one additive manufacturing process in accordance with the present disclosure.
Figure 3B:
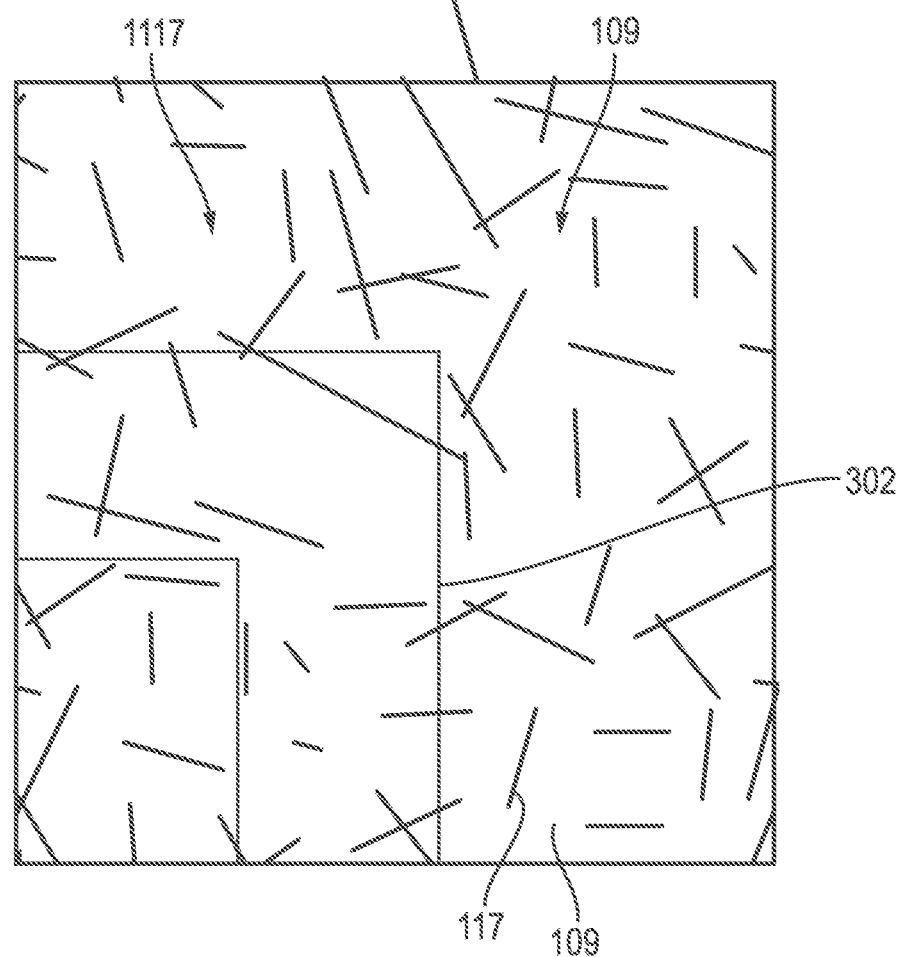

Referring to FIG. 3A, a representative image 300 of the top layer of the fabrication chamber 102, referred to herein as the fabrication bed 103 is shown. The fabrication bed 103 includes raw material 109 that has been moved from the material chamber 108 to the fabrication chamber 102 as well as reinforcement material 117 that has been moved from the reinforcement material chamber 116 to the fabrication chamber 102. Image 300 shows the raw material 109 and reinforcement material 117 as well as a superimposed image 302 that represents the area of the material that is to be fused to form a layer of the object being fabricated. FIG. 3B illustrates a close-up view of a section of FIG. 3A, which shows an arrangement of the reinforcement material 117 (illustrated as short reinforcing fibers) in the raw material 109 relative to the image 302 of the part being created, and it is important to note that the reinforcement material is introduced to the fabrication bed so as to land in a random arrangement. The close-up image of FIG. 3B illustrates the image data captured by the camera 130 across the entire fabrication bed 103. The camera 130 is configured to capture image data with sufficient resolution that the location and orientation of the reinforcing material 117 can be discerned by the computer 132 via image analysis, providing information usable by the system 100 in order to dynamically determine a toolpath and thereafter operate the assembly tool with a layer-by-layer, dynamic determination of a toolpath rather than a prescribed, predefined toolpath chosen based just on object contours and perhaps assumptions about strength.

Figure 3C:
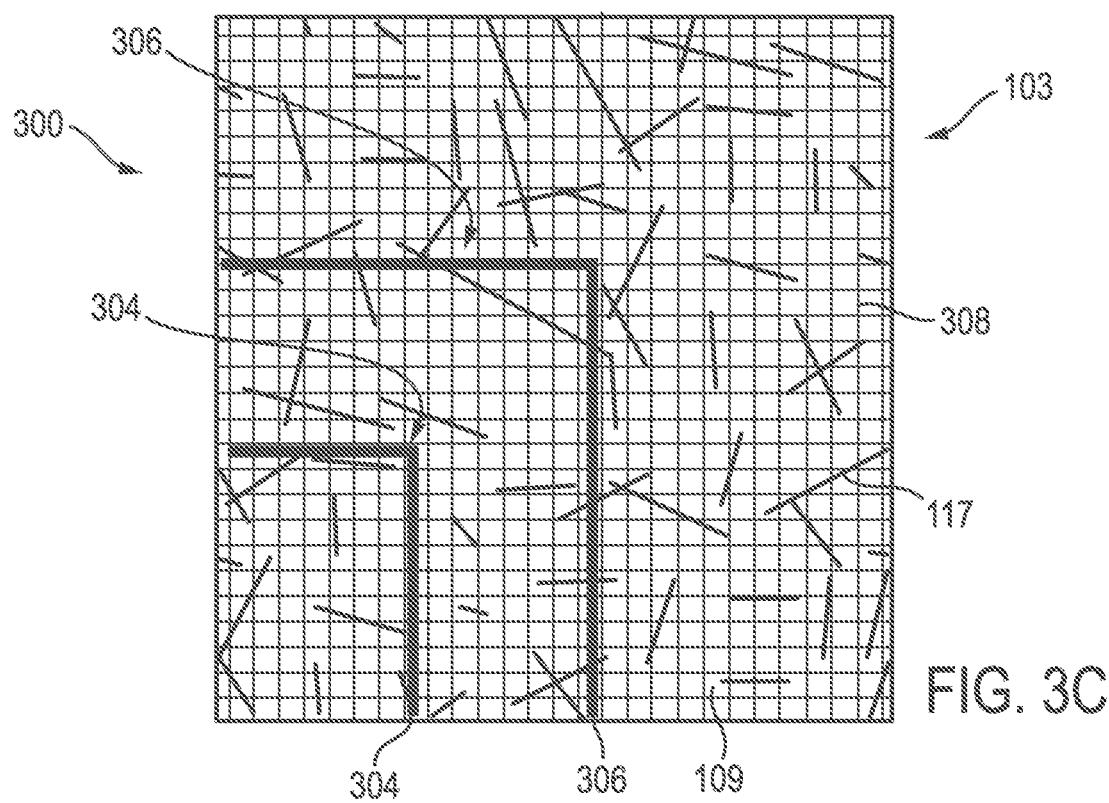

FIG. 3C illustrates the image of FIG. 3B after undergoing further image processing by the computer 132. The image processing as represented in the schematic illustration of FIG. 3C assists with a topology analysis process, which is discussed below in connection with FIG. 3D. As can be seen in FIG. 3, the boundaries for the topology analysis are established. The boundaries are represented by boundary lines 304 and 306. The boundary lines 304 and 306 correspond to the outer boundary of the object being fabricated A (on a layer-by-layer basis). Using the image data captured by camera 130, the local distribution of the reinforcing material 117 (which can be considered as "inclusions") is acquired within the image 300. By processing the image, pixels representing the reinforcing material can be identified and distinguished from the pixels representing the raw material. The result of the analysis is saved in the memory which is available to the processor executing this function. In one implementation, a pixel distinguishing process is performed on individual subsections of the image 300. By analyzing subsections sequentially, the computing power of the system can be utilized in an efficient manner. In one or more implementations, the subsections are analyzed in parallel by multicore or multiple processors, and the output of each such analysis is saved in the memory available to such processors. If the camera has an appropriate resolution capability and the available computing power is sufficient to handle the task, the imaging processing and pixel distinguishing process can be performed on the entire fabrication bed during a single step or process, again, saving the analysis to the memory being used for this purpose. It is believed that, based on current commercial technology capabilities, performing imaging processing on subsections of the bed can shorten the computation of the topology analysis, which is discussed in more detail below.

In one particular implementation, a finite element mesh is created based on the distinguished pixels within the processed image. The finite element mesh is represented by gridlines 308 in the image of FIG. 3C. In certain implementations, the finite element mesh is used during the topology analysis process in which topology analysis software is configured with an algorithm adapted by code to perform this analysis. A topology analysis software module executing on computer 132 determines the regions of raw material in the fabrication bed 103 (as indicated in the image 300) which are to be fused, if possible, to bridge the reinforcing material within the boundaries of the part being manufactured in order to achieve a specified characteristic of the part (e.g., reduced weight, increased strength, a combination of both, or other qualities, etc.). Various constraints/characteristic objectives can be inputted into the topology analysis software (e.g., by an operator predesignating the characteristic objectives for the part being manufactured). For example, constraints can include the maximum amount of raw material to be incorporated in the part (e.g., the raw material content can be limited to 30% of the area of each layer of the object being manufactured). Similarly, mechanical properties of the part can be designated (e.g., a global maximum displacement under a given load). Using these constraints, the algorithm employed by the topology analysis software identifies regions to be fused to satisfy these requirements, entirely or within a prescribed amount for any given parameter or for all parameters.

Figure 3D:
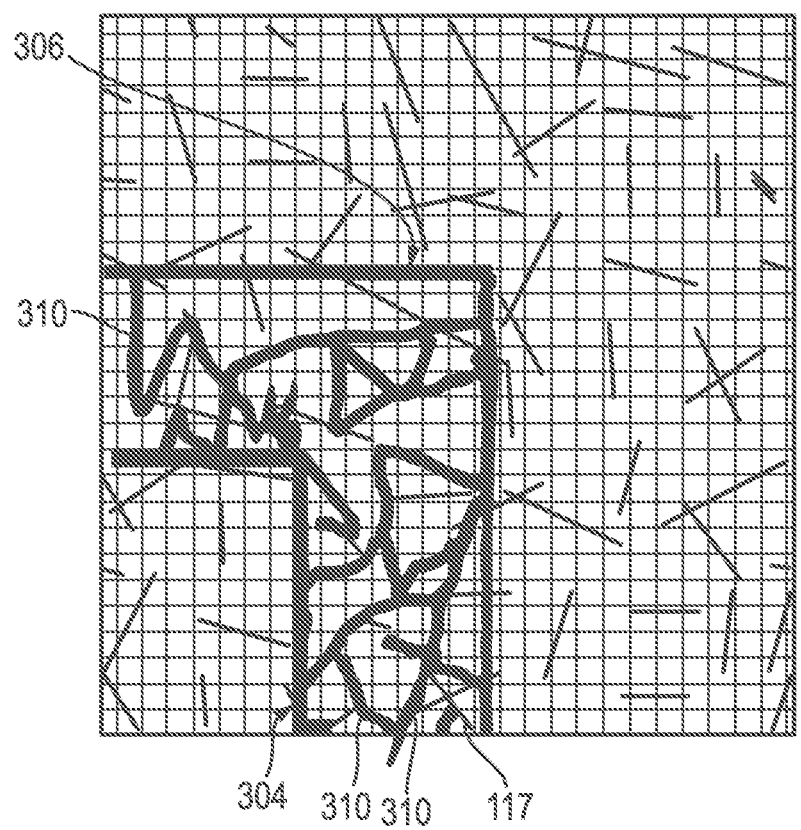

In certain embodiments consistent with the present disclosure, a maximum size of a given rib of fused raw material can be defined. As can be seen in FIG. 3D, rib toolpath lines 310 are illustrated that span between the part boundaries 304, 306 and various individual pieces of reinforcing materials within the part boundaries. The rib toolpath lines 310 represent areas of the raw material that will be later fused by the system to create a honey-comb-like structure within the object being fabricated which consists of ribs of fused material that incorporate reinforcement material. By limiting the maximum width of a rib to correspond to parameters of the fusing tool enables each of the ribs to be fused via a single pass of the tool. For example, if the maximum width of the fusing tool (e.g., laser beam 128) is two millimeters, limiting the maximum width of each rib to two millimeters means that each rib can be formed via a single pass of the tool. Designating such a maximum width constraint can reduce the number of tool passes to create the object and thereby increase efficiency and reduce manufacturing times.

The topology analysis software can be configured to achieve one or multiple objectives simultaneously (e.g., "reduce weight" and "minimize maximum stress under a given load"). By using the topology analysis software configured with an algorithm adapted by code to satisfy these objectives, a finite element analysis can be performed by taking into account (1) the actual location of individual pieces of the reinforcement material as it is distributed in a given layer, as shown in the image 300 taken of the fabrication bed 103 which is the top layer facing the camera, (2) the geometry of the part being manufactured, and (3) the designated object characteristics to be achieved in the finished object, to determine a more optimal fused structure that incorporates the randomly distributed reinforcement material and meets, exceeds, or approximates these criteria, at least within a prescribed range which can be zero for some of these criteria (e.g., cannot exceed external object dimensions). Once the optimal structure of the layer has been calculated, a toolpath software module can convert the optimal structure into a path for the tool of the fabrication system.

Figure 3E:
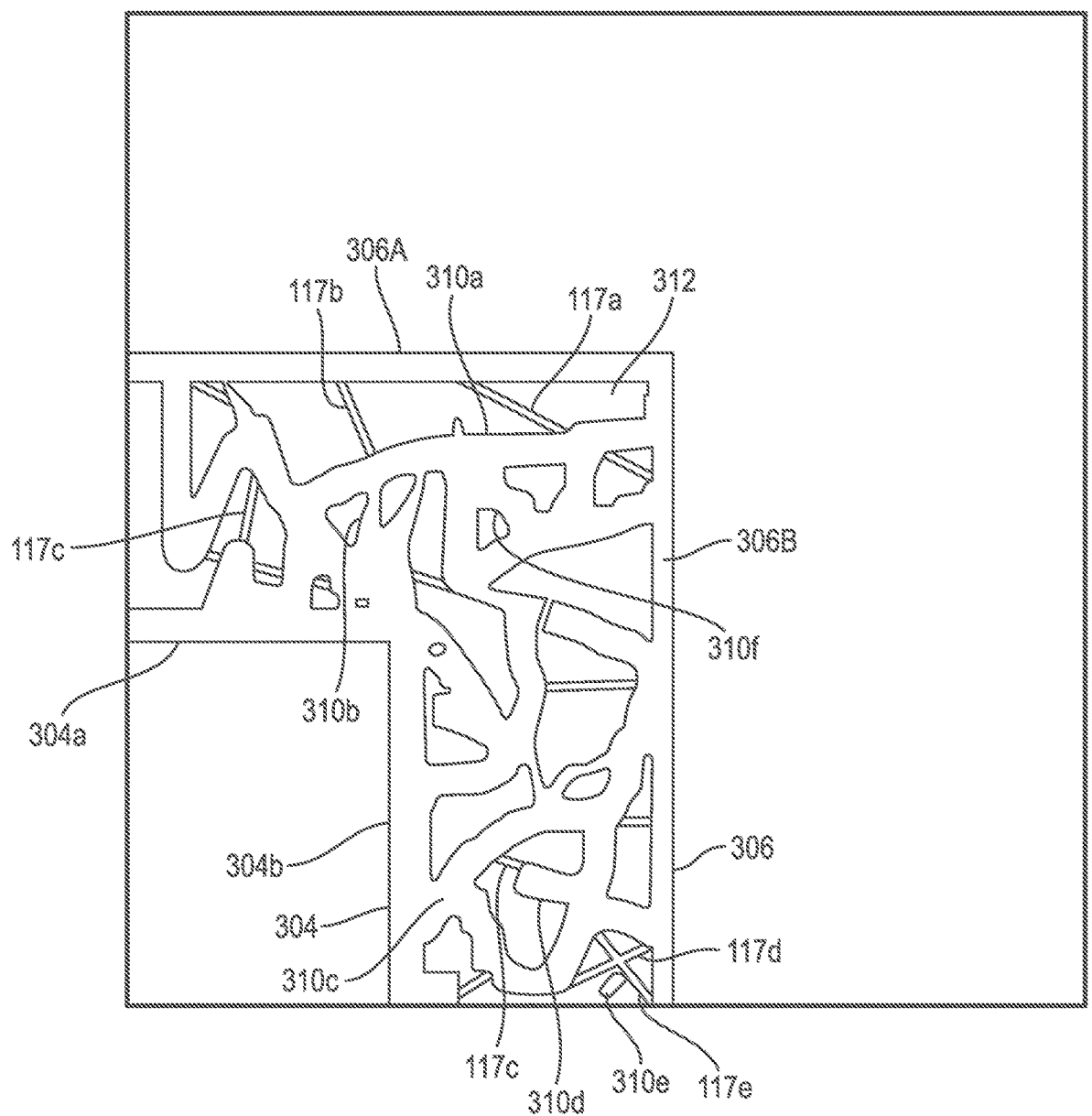

Referring to FIG. 3E, a printed subsection of the object to be fabricated is shown. The fabricated layer is "printed" using the activation tool (e.g., the laser 124 and mirror 126 shown in FIG. 1) by following the toolpath calculated via the toolpath software module to create a custom network of fused raw material bridging reinforcements. For example, reinforcement 117a spans between the fused outer boundary 306a and the fused outer boundary 306b. As such, both ends of reinforcement 117a are structurally bonded to the object by being encapsulated in the fused material of the boundaries 306a, 306b. Accordingly, force can be transmitted through the reinforcing material 117a, thereby enhancing the strength of the part in the area of the incorporated reinforcement 117a. By taking advantage of the strength of the reinforcement 117a, the amount of raw material that would otherwise be required to be fused can be reduced, resulting in the ability to incorporate voids in the area of the reinforcement, such as void 312, for example. As such, weight and material savings can be achieved by executing the topology analysis software in view of such criteria to determine a toolpath that takes advantage of the random placement of the reinforcement 117a in that particular layer of the object.

Similarly, reinforcement material which does not extend between outer boundaries of the object being fabricated can be incorporated using ribs 310, as discussed above. For example, reinforcing material 117b has a first end encapsulated by the boundary wall 306a and a second end encapsulated by a rib of fused material 310a. Rib 310a can be structurally connected to the boundary wall of the object either directly (e.g., via wall 306b as illustrated in FIG. 3D) or indirectly via additional ribs (e.g., rib 310b, which extends between rib 310a and boundary wall 304a as illustrated in FIG. 3D). Further, pieces of reinforcement material which do not have either end intersecting a boundary wall of the object (e.g., reinforcement 117c) can be structurally incorporated using ribs that extend from the boundary walls to the reinforcement (e.g., ribs 310c, 310d as illustrated in FIG. 3D). In addition, pieces of reinforcement that intersect each other can be structurally bonded at the intersection via a rib to increase the overall strength of the object, such as, for example, with reinforcements 117d and 117e and rib 310e.

Moreover, ribs can be created which extend between boundary walls and/or other ribs without encapsulating any reinforcement material. For example, if the random distribution of the reinforcement material is such that reinforcement material is not located within an area of the object that requires structural support, the toolpath can be determined for this layer so that ribs that do not directly connect to reinforcement material can be created to provide structural support. These reinforcement-lacking ribs can extend between boundary walls and/or other ribs (e.g., rib 310f extends between adjacent ribs to provide structural support without directly incorporating reinforcement material). It should be understood that the topology analysis software can take into consideration the characteristics and topology of one or more previously fused layers in determining whether and where ribs are needed for a given layer in view of the further properties inputted for the object to be manufactured.

Figure 4:
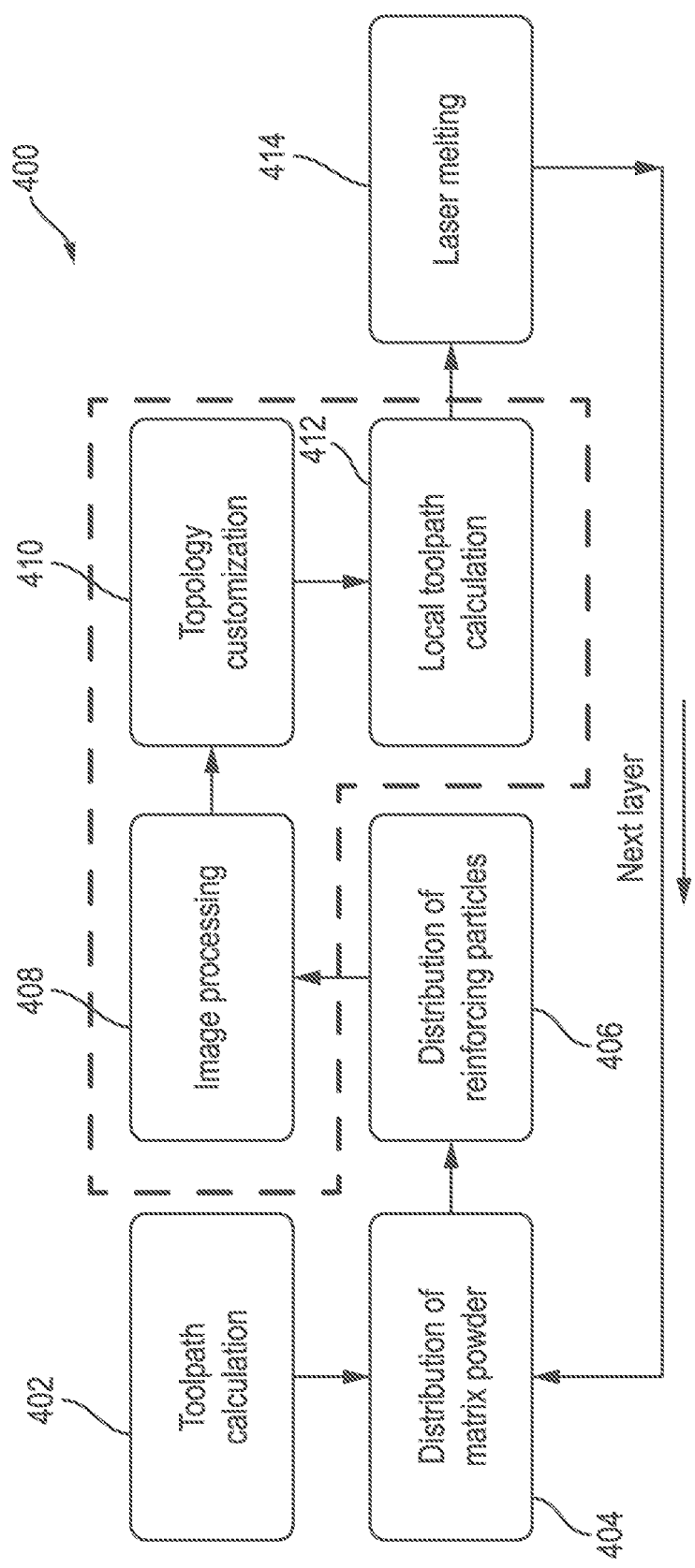
FIG. 4 is a flow chart of an additive manufacturing process.

The material distribution, toolpath determination, and material fusing process can be carried out successively, layer-by-layer, until the object being formed is fully manufactured. Referring to FIG. 4, the layer-by-layer fabrication process is illustrated using an exemplary flow chart 400. At step 402, a toolpath is calculated for the present layer being fabricated. The toolpath at step 402 can be a base line toolpath that is calculated assuming there is no toolpath customization since data regarding the arrangement of the reinforcement material is not yet obtained. As one example, the toolpath at step 402 can be a toolpath that would fuse a solid layer of the raw material. At step 404, raw material is moved from raw material chamber 108 to fabrication chamber 102 via roller 114 moving across the exposed top surface of the raw material 109 and distributing that raw material 109 across the top surface of the fabrication chamber 102 to define the fabrication bed 103. Similarly, at step 406, reinforcement material is moved from reinforcement material chamber 116 to fabrication chamber 102 via roller 122 moving across the exposed top surface of the reinforcement material 117 and distributing that reinforcement material 117 across the top surface of the fabrication chamber 102 to add reinforcement material in a random manner to the fabrication bed. At steps 408-412, the topology analysis method as discussed above is implemented, in which an image 300 of the fabrication bed is captured using camera 130 and analyzed using computer 132 executing code which configures the processor to identify the arrangement of the randomly distributed reinforcement material identified within the image 300 relative to the layer of the object being manufactured, and in which a customized topology is determined and a new, customized toolpath is calculated. At step 414, the laser 124 and mirror 128 are operated to fuse (e.g., melt) the raw material according to the new, customized toolpath. Process 400 can then be repeated as each layer of the part is formed and/or, if each layer is being analyzed in subsections, the process can be performed for each subsection of each layer. In one particular implementation consistent with the disclosure, the customized toolpath can be optimized in regard to one or more of the object's criteria that have been inputted to the system 100, such as weight or strength, and this can be repeated in regard to each layer of the object as it is being manufactured. A topology optimization program can be used to find an optimal toolpath for a given layer of the additive manufacture of a part, such as available from Ansys, Inc., of Canonsburg, Pa. or Optistruct, available from Altair Corporation of Lincolnshire, Ill.

Accordingly, by imaging the location and orientation of the randomly deposited reinforcement material, the computer imaging can take into account the actual arrangement of the reinforcements and create a customized toolpath based on the specific arrangement of the reinforcement material as it has been randomly deposited. By creating a customized toolpath, an object can be created which takes advantage of the randomized reinforcement material by incorporating it into the structure of the object by fusing the raw material so as to structurally connect it to the object. By creating a customized toolpath, there is a greater ability to create an object with more desirable properties than by using a predetermined toolpath. For example, by customizing the toolpath to take into account the actual location of the randomly deposited reinforcing material, the raw material need only be fused/activated in areas that will result in reinforcement bonding. As such, the amount of raw material that is actually fused can be reduced, resulting in a reduced weight of the object, without reducing the strength of the object since the reinforcing material has been incorporated. In certain applications, the topology analysis software can take into account the customized tool path of the previous layer when determining the customized toolpath of the successive layer. For example, if a large amount of reinforcement material was incorporated into the structure in a particular area of the previous layer, the successive layer may not require as much structural reinforcement in the corresponding area since it may be possible to rely upon the increased strength of the previous layer. Accordingly, the toolpath can be customized in view of prior layer determinations and tool operations. As such, the customized toolpath can provide advantages over other manufacturing processes which rely on predetermined toolpaths.

Figures 5A, 5B:
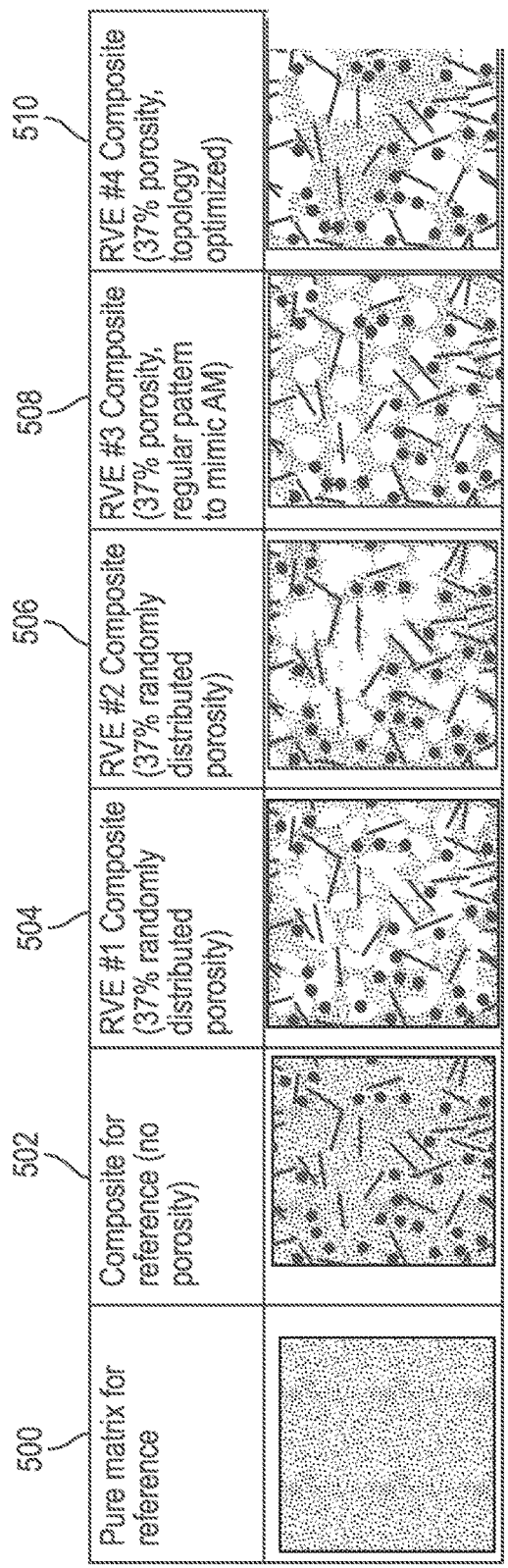
FIGS. 5A and 5B provide illustrative examples of manufacturing process to compare characteristics of each.

As one non-limiting example, it is understood that a customized topology toolpath as described above (e.g., a toolpath customized to the arrangement of the randomly distributed reinforcement material) can provide significant structural advantages over other methods. Referring to FIG. 5A, several arrangements are shown of an object which includes two types of reinforcement material, namely, beads B (e.g., glass beads; the round objects in the figure) and fibers F (e.g., glass fibers; the fiber strands in the figures). These objects are manufactured with various toolpath methods. For example, image 500, which is a control or benchmark, shows a continuous toolpath formed object (e.g., a fully solid object in which all the raw material within the object boundaries is fused), image 502 shows a continuous toolpath object that includes reinforcement material (e.g., a fully solid object that includes reinforcement material), image 504 illustrates an object manufactured to have about 37% porosity wherein the voids are oval in shape and randomly distributed, image 506 illustrates an object that is manufactured to have about 37% porosity wherein the voids are circular in shape and randomly distributed, image 508 illustrates an object that is manufactured to have about 37% porosity wherein the voids are circular in shape and distributed according to a repeating pattern, and image 510 illustrates an object that is manufactured to have about 37% porosity wherein the voids are formed as a result of the topology analysis process of the present disclosure in which the toolpath is "customized" based on the actual arrangement of randomly distributed reinforcement material in at least one layer of the object.

FIG. 5B illustrates the understood strength characteristics of the objects formed based on the toolpath methods 500-510. As can be seen in the table, an object 510 created with the topology analysis method of the present disclosure has a Specific Modulus that is nearly two to four times greater than the other objects created with porosity (504-508) and is close to the solid objects (500-502), while having a reduced density as compared to the solid objects. Accordingly, an object created using the topology analysis method of the present disclosure offers significant structural advantages over prior art additive manufacturing methods and systems.

Referring once more to FIGS. 2A and 2B, variations in the structure and arrangement of the fabrication equipment can be utilized. While similar to the equipment illustrated in FIG. 1, the equipment 600 in FIG. 2A includes a second reinforcement material chamber 602 and roller 604. Accordingly, system 600 can be used to fabricate parts with two different reinforcement materials. For example, chamber 106 and roller 122 can be used to distribute a first reinforcement material (e.g., beads, such as glass beads) and chamber 602 and roller 604 can be used to distribute a second reinforcement material (e.g., fibers, such as glass fibers). The topology analysis system can identify both types of reinforcement materials and determine an optimized toolpath based on the distribution of the reinforcement materials. Also, similar to the equipment illustrated in FIG. 1, the equipment 610 in FIG. 2B includes a moveable drop depositor 612 for dropping the reinforcement material across the fabrication bed 103, as opposed to using chamber 116 and roller 122 as shown in FIG. 1. Other structural arrangements of equipment can be used for depositing the raw material and the reinforcement material in the fabrication bed, as these technologies form no part of the present invention, but rather are used to queue a given layer of an object being manufactured for imaging, analysis and control over the fusing tool. The present system offers the advantage that the reinforcement material can be randomly deposited, which greatly simplifies the manufacturing process, while the toolpath can be optimized based on the random orientation of the reinforcement to result in a manufactured part having superior characteristics.

As one non-limiting example of a manufactured object which benefits from the present disclosure, the object can be a part used in the aerospace industry. A raw material and reinforcing material can be selected that is suitable for the intended application. In other words, materials can be selected that are capable of meeting the design requirements for a given application. The design requirements for an aerospace part are generally understood as being more exacting than those for a part of a toy doll, for instance. During the layer-by-layer manufacturing, the topology analysis process can take into account various factors, including 1) the geometry of the part being manufactured, 2) the specified design criteria of the object, such as load carrying capability, weight of the object, maximum deflection, etc., 3) the material properties of the raw material being used, 4) the material properties of the reinforcement material being used, and 5) the arrangement of the individual pieces of reinforcement material relative to the layer geometry of the layer presently being formed, among other factors (e.g., thermal properties, porosity, acoustic properties, etc.). Based on these factors, which can be inputted into the algorithm which drives the topology analysis software, a toolpath can be determined in which the raw material is fused to define the layer of the object in such a way that individual pieces of reinforcement material are structurally incorporated into the object. The reinforcement material is "structurally incorporated" when it is secured in the object in a way in which it increases the strength of the object and in which the object avails itself of the characteristics of the reinforcement material. As result of the structural incorporation of the reinforcement material into the object, less raw material will need to be fused in order to obtain the desired design characteristics of the object and so voids (i.e., areas where the raw material is not fused) can be incorporated into the part. Thus, a reduction in weight of the part can be achieved by defining a toolpath that results in the object being formed with the desired properties. As such, by taking into account these various factors, processing the image data to identify the arrangement of individual pieces of reinforcement material as they are arranged on the fabrication bed of layer presently being formed, the toolpath analysis process creates a customized toolpath.

Notably, the figures and examples above are not meant to limit the scope of the present disclosure to a single implementation, as other implementations are possible by way of interchange of some or all of the described or illustrated elements. Moreover, where certain elements of the present disclosure can be partially or fully implemented using known components, only those portions of such known components that are necessary for an understanding of the present disclosure are described, and detailed descriptions of other portions of such known components are omitted so as not to obscure the disclosure. In the present specification, an implementation showing a singular component should not necessarily be limited to other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present disclosure encompasses present and future known equivalents to the known components referred to herein by way of illustration.

The foregoing description of the specific implementations will so fully reveal the general nature of the disclosure that others can, by applying knowledge within the skill of the relevant art(s) (including the contents of the documents cited and incorporated by reference herein), readily modify and/or adapt for various applications such specific implementations, without undue experimentation, without departing from the general concept of the present disclosure. Such adaptations and modifications are therefore intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s). It is to be understood that dimensions discussed or shown are drawings are shown accordingly to one example and other dimensions can be used without departing from the disclosure.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A method for manufacturing an object using an additive manufacturing process, comprising the steps of:
   providing loose raw material to a fabrication bed;
   providing loose reinforcement material to the fabrication bed;
   capturing an image of the raw material and the reinforcement material;
   processing the image to identify an arrangement of the reinforcement material in the fabrication bed;
   dynamically determining a toolpath based upon the arrangement of the identified reinforcement material; and
   operating a tool to activate the raw material along the determined toolpath in a layer of the object being manufactured.

2. The method of claim 1, wherein the step of dynamically determining the toolpath based on the arrangement of the identified reinforcement material comprises:
   identifying a portion of raw material to be activated to structurally incorporate at least a portion of the loose reinforcement material into the layer of the object being manufactured.

3. The method of claim 2, wherein the step of dynamically determining the toolpath further comprises identifying another portion of raw material that is not activated to define a void, and the step of operating the tool further comprises controlling the tool to activate the raw material in the layer of the object being manufactured so as to bound the void.

4. The method of claim 1, wherein the step of dynamically determining the toolpath based on the arrangement of the identified reinforcement material comprises:
   identifying an individual piece of reinforcement material which resides between boundary walls of the object being manufactured;
   defining a rib as a portion of raw material to be activated so as to structurally incorporate the individual piece of reinforcement material;
   wherein the rib extends between at least one of the boundary wall and a portion of the individual piece of reinforcement material.

5. The method of claim 1, wherein the step of providing reinforcement material to a fabrication bed includes providing a first and a second reinforcement material.

6. The method of claim 5, wherein one of the first and second reinforcement materials is a bead and the other of the first and second reinforcement material is a fiber.

7. The method of claim 1, wherein the step of determining the toolpath based on the arrangement of the identified reinforcement material comprises reducing the weight of the object being manufactured by reducing the total amount of raw material that is activated by the tool.

8. The method of claim 1, wherein the step of determining the toolpath based on the arrangement of the identified reinforcement material comprises minimizing a maximum stress under a given load of the object being manufactured.

9. The method of claim 1, wherein the step of determining the toolpath based on the arrangement of the identified reinforcement material comprises reducing the weight of the manufactured object and minimizing a maximum stress under a given load of the object being manufactured.

10. The method of claim 1, wherein the step of providing loose reinforcement material comprises providing the loose reinforcement material having a random distribution.

11. The method of claim 1, wherein the step of capturing the image comprises capturing the image using a camera.

12. The method of claim 1, wherein the loose reinforcement material comprises fibers having a shape selected from the group consisting of: straight, hooked, crimped, double duoform, paddled, enlarged ends, and indented.

13. The method of claim 1, wherein the loose reinforcement material comprises fibers having a cross-section selected from the group consisting of: round, rectangular, and bundled.

14. The method of claim 1, wherein the loose reinforcement material is selected from the group consisting of: a bead, a closed ring, an open ring, a mesh, a block, and a piece of sheet metal.

15. A system for manufacturing an object from a raw material and a reinforcement material using an additive manufacturing process, comprising:
   a fabrication chamber;
   a raw material reservoir configured to dispense the raw material;
   a reinforcement material reservoir configured to dispense the reinforcement material;
   a fabrication bed supported by fabrication chamber, the fabrication bed having a portion of the raw material depositable thereon from the raw material reservoir as a layer and a portion of the reinforcement material depositable thereon as part of the layer;
   a camera configured to capture an image of the fabrication bed;
   a computer having a processor and software executable by the processor, wherein the computer is configured to process the image to identify the reinforcement material within the layer of the fabrication bed, the computer further being configured to dynamically determine a toolpath based on an arrangement of the identified reinforcement material in the layer;
   a tool configured to activate the raw material of the fabrication bed, wherein the tool can be controlled to operate along the determined toolpath, wherein the reinforcement material reservoir is configured to dispense the reinforcement material having a random distribution.

16. The system of claim 15, further including another reinforcement material reservoir containing another reinforcement material, the fabrication bed further having a portion of the another reinforcement material depositable thereon as part of the layer, wherein the computer is further configured to process the image to identify the another reinforcement material and determine the toolpath based on an arrangement of both reinforcement materials within the layer.

17. The system of claim 15, wherein the reinforcement material comprises fibers having a shape selected from the group consisting of: straight, hooked, crimped, double duo-form, paddled, enlarged ends, and indented.

18. The system of claim 15, wherein the reinforcement material comprises fibers having a cross-section selected from the group consisting of: round, rectangular, and bundled.

19. The system of claim 15, wherein the reinforcement material is selected from the group consisting of: a bead, a closed ring, an open ring, a mesh, a block, and a piece of sheet metal.

* * * * *